United States Patent Office 3,417,064
Patented Dec. 17, 1968

3,417,064
POLYMERS OF 1,2-ALKYLENE OXIDES
Frederick E. Bailey, Jr., Charleston, W. Va., assignor to Union Carbide Corporation, a corporation of New York
No Drawing. Continuation-in-part of application Ser. No. 188,879, Apr. 19, 1962. This application May 27, 1963, Ser. No. 283,613
The portion of the term of the patent subsequent to Apr. 24, 1979, has been disclaimed
13 Claims. (Cl. 260—79.5)

This application is a continuation-in-part of application Ser. No. 188,879 entitled "Polymers of 1,2 - Alkylene Oxides" by F. E. Bailey, Jr., filed Apr. 19, 1962, abandoned Feb. 14, 1964. Ser. No. 188,879 is a continuation-in-part of application Ser. No. 772,158, entitled "Copolymerization of Alkylene Oxide and Vinyl Epoxy Compounds" by F. E. Bailey, Jr., filed Nov. 6, 1958, now U.S. Patent No. 3,031,439, which in turn is a continuation-in-part of application Ser. No. 587,934 entitled "Polymers with Ethylene Oxide" by F. E. Bailey, Jr., filed May 29, 1956, abandoned Mar. 16, 1959, all of said applications being assigned to the Union Carbide Corporation.

This invention relates to preparation of polymers of 1,2-alkylene oxides. In one aspect, the invention relates to various processes for preparing polymers of 1,2-alkylene oxide which contain pendant vinyl groups. In another aspect, the invention relates to the aforesaid vinyl-containing polymers. In a further aspect, the invention relates to novel polymers prepared by cross-linking copolymers of 1,2-alkylene oxides and vinyl epoxy monomers through the pendant vinyl groups thereof.

In one aspect, the present invention is directed to novel polymers which are prepared by cross-linking copolymers of 1,2-alkylene oxides and vinyl epoxy monomers. Inasmuch as the solid copolymers are obtained by polymerization of the 1,2-alkylene oxide and vinyl epoxy monomer through the epoxy groups, said solid copolymer product is characterized along the polymer chain, by reactive pendant groups which contain a terminal vinyl or vinylidene radical, i.e., CH$_2$=CH— or CH$_2$=C<. Cross-linking the copolymer chains through these reactive pendant groups provides the novel compositions of this invention which are useful in the preparation of various molded or shaped articles, films, elastomers, and the like.

It is pointed out at this time that for sake of convenience, the terms "polymer(s)" and "copolymer(s)" are used in their generic sense, i.e., these terms encompass within their scope polymers prepared from a mixture of two, three, four, etc., polymerizable monomers. In addition, the term "copolymer(s)" is employed to designate the product obtained via the polymerization through the vicinal epoxy group of the monomers, said product being characterized by pendant vinyl groups. On the other hand, the term "polymer(s)" is employed to signify the product obtained by cross-linking the above-defined "copolymer(s)" through the pendant vinyl groups.

Accordingly, one or more of the following objects will be achieved by the practice of the instant invention. It is an object of the invention to provide novel cross-linked polymers which exhibit a wide variety of physical properties. A further object is to provide novel cross-linked polymers which are particularly useful in the preparation of molded or shaped articles, films and elastomers. Another object of this invention is to provide novel elastomers which have the combined characteristics of excellent tensile properties, good tear strength and outstanding resistance to low temperature embrittlement. A further object is to provide novel elastomers which can be milled and compounded in a manner comparable to natural rubber. A still further object of this invention is to provide novel elastomeric materials by cross-linking copolymers of alkylene oxides and vinyl epoxy monomers. Another object of this invention is to provide novel elastomeric materials by cross-linking copolymers of propylene oxide and a vinyl epoxy monomer. A further object is to provide novel polymeric materials by cross-linking copolymers of ethylene oxide and a vinyl epoxy monomer. Another object is to provide a novel process for the preparation of copolymers of 1,2-alkylene oxides and vinyl epoxy monomers. A further object is directed to the preparation of copolymers of 1,2-alkylene oxides, e.g., propylene oxide, and vinyl epoxy monomers, said copolymers having a reduced viscosity of at least 0.5, and being comprised of a major amount of said 1,2-alkylene oxide chemically combined therein. A still further object of this invention is to provide a process for the preparation of the aforesaid novel cross-linked polymers. These and other objects will readily become apparent to those skilled in the art in the light of the teachings herein set forth.

In a broad aspect, the present invention is directed to the preparation of solid, cross-linked polymers, the properties and characteristics of which can be "tailor-made" to fit a wide variety of uses and fields of applications. The properties of the copolymers, as initially prepared, can be varied over a wide range depending upon the proportion and kind of monomeric reagents employed. For instance, those solid copolymers which contain a major proportion by weight of ethylene oxide, propylene oxide, butylene oxide, etc., and mixtures thereof, can be subjected to molding at elevated temperatures, or milled at moderately elevated temperatures, e.g., about 50° C., to give useful and novel cross-linked polymers. In addition, by virtue of the highly reactive terminal vinyl or vinylidene sites the solid copolymers can be cross-linked by the use of, for example, organic peroxide catalysts such as benzoyl peroxide, acetyl peroxide, tertiary butyl hydroperoxide, and the like, to form tough, cross-linked compounds. A particularly preferred class of solid copolymers, as hereinafter defined, also can be cured by conventional methods employed in the natural and synthetic rubber arts to form tough, cross-linked elastomeric materials. As is readily apparent, the novel cross-linked polymers, as illustrated above, are highly useful for a variety of applications, for example, in the preparation of various molded or shaped articles, films, elastomers, and the like.

As previously indicated, the novel cross-linked polymers of this invention are prepared from the copolymers of 1,2-alkylene oxides and vinyl epoxy monomers. The 1,2-alkylene oxides can be further characterized by the following formula:

(I) 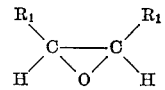

wherein each $R_1$, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R_1$ variables can be alkylene radicals which together with the epoxy carbon atoms, i.e., the carbon atoms of the epoxy group,

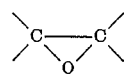

form a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative R₁ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. It is to be understood, also, that the term "lower 1,2-alkylene oxides" designates that each $R_1$ variable of the above-depicted structural formula can be satisfied by hydrogen or lower alkyl, e.g., methyl, ethyl, propyl, isobutyl and the like.

Representative, 1,2-alkylene oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4 - cyclohexyl - 2,3-epoxypentane, chlorostyrene oxide, styrene oxide, ortho-, meta-, and para-ethylstyrene oxide, the oxabicycloalkanes, e.g., 7-oxabicyclo[4.1.0]heptane, 6 - oxabicyclo[3.1.0]hexane, 4-propyl-7-oxabicyclo[4.1.0]heptane, 3-amyl - 6 - oxabicyclo[3.1.0] hexane and other alkyl-substituted oxabicycloalkanes; and the like.

The vinyl epoxy monomer contemplated for use in preparing the copolymers can be characterized by the following formula:

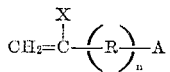

wherein R is a divalent saturated aliphatic hydrocarbon radical containing at least one carbon atom, e.g., alkylene, alkylidene; wherein $n$ is an integer equal to zero or one; wherein X is hydrogen, halogen, or alkyl; and wherein A can be epoxyalkyloxy, epoxyacyloxy, epoxyalkyl, epoxycycloalkylalkyloxy, epoxycycloalkyloxy, epoxyalkylaryl, epoxyalkylsulfonyl, and the unit

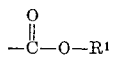

wherein $R^1$ can be epoxyalkyl or epoxycycloalkylalkyl. In addition, each epoxy carbon atom, i.e., the carbon atoms of the group

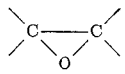

contained in the radicals encompassed within the scope of the variable A has at least one hydrogen attached thereto. Illustrative radicals for R include, for example, methylene, ethylene, propylene, butylene, 2-methylbutylene, hexylene, octylene, 2,4-dimethyloctylene, 3-propylheptylene, ethylidene, propylidene, butylidene, isopentylidene, octylidene, and the like. It is preferred that R be a lower alkylene or alkylidene radical, i.e., methylene, propylene, butylene, ethylidene, butylidene, and the like. Typical radicals for X include, among others, chlorine, bromine, methyl, ethyl, propyl, amyl, 2-ethylhexyl, octyl, dodecyl, and the like. It is preferred that X be hydrogen, chlorine or lower alkyl, e.g., methyl, propyl, butyl, and the like. Representative radicals for A include, among others, epoxyethyl, 2,3 - epoxypropyl, 2,3 - epoxybutyl, 3,4-epoxybutyl, 2,3-epoxyhexyl, 3 - propyl-4,5-epoxyheptyl, 2,3-epoxypropanoyloxy, 2,3-epoxybutanoyloxy, 2,3-epoxyhexanoyloxy, 2,3-epoxyoctanoyloxy, 3,4-epoxypentanoyloxy, 4,5-hexanoyloxy, 4,5-pentanoyloxy, 9,10-epoxyoctadecanoyloxy, 10,11-epoxyundecanoyloxy, 3,4-epoxycyclohexylcarbonyloxy, 2,3 - epoxycyclopentylcarbonyloxy, glycidyl, 2,3-epoxybutoxy, 2,3-epoxypentoxy, 4,5-epoxyhexoxy, 2-ethyl-3,4-epoxyoctoxy, 6,7-epoxydecoxy, 3,4-epoxycyclohexyl-methoxy, 2,3-epoxycyclopentylmethoxy, 2,3-epoxypentylethoxy, 3,4-epoxycyclohexyloxy, 2,3-epoxycyclopentyloxy, 3,4-epoxycycloheptyloxy, ortho-, meta-, and para-epoxyethylphenyl, epoxyethyltolyl, epoxyethylsulfonyl, 2,3-epoxypropylsulfonyl, 2,3-epoxybutylsulfonyl, and the like.

Illustrative vinyl epoxy monomers which can be employed include, for example, epoxy-1-alkene, e.g., 3,4-epoxy-1-butene, 2-chloro-3,4-epoxy-1-butene, 2-methyl-3,4 - epoxy - 1-butene, 2-bromo-3,4-epoxy-1-butene, 1,2-epoxy-3-methyl-4-pentene, 4,5-epoxy-1-pentene, 2-methyl-5,6-epoxy-1-hexene, 7,8-epoxy-1-octene, and the like; terminal alkenyl epoxyalkanoates, e.g., vinyl 4,5-epoxypentanoate, allyl 5,6-epoxyhexanoate, allyl 2,3-epoxybutanoate, allyl 3,4-epoxypentanoate, vinyl 10,11-epoxyundecanoate, allyl 10,11-epoxyundecanoate, allyl 9,10-epoxystearate, vinyl 9,10-epoxystearate, allyl 2,3-epoxypropanoate, 3-butenyl 2,3-epoxybutanoate, 5-hexenyl 2,3-epoxyhexanoate, 4-pentenyl 2,3-epoxypentanoate, vinyl 3,4-epoxycyclohexanecarboxylate, allyl 3,4-epoxycyclohexanecarboxylate, allyl 3,4-epoxy-6-methylcyclohexanecarboxylate, 3-butenyl 2,3-epoxycyclopentanecarboxylate and the like; terminal alkenyl epoxyalkyl ether, e.g., allyl glycidyl ether, allyl 2,3-epoxybutyl ether, allyl 2,3-epoxypentyl ether and the like; terminal alkenyl epoxycycloalkyl ether and terminal alkenyl epoxycycloalkylalkyl ether, e.g., allyl 3,4-epoxy-cyclohexylmethyl ether, allyl 2,3-epoxycyclopentyl ether, allyl 6-methyl-3,4-epoxycyclohexylmethyl ether and the like; allyl glycidyl sulfone, 2-methyl-2-propenyl 2,3-epoxypropyl sulfone, ortho-, meta-, para-divinylbenzene monoxide, allyl 3,4-epoxycyclohexylmethyl ether, cyclopentylmethyl ether, allyl 6-methyl-3,4-epoxycyclo-allyl 2,3-epoxyhexylmethyl ether, 2,3-epoxypropyl acrylate, 2,3-epoxybutyl acrylate, 4,5-epoxyhexyl acrylate, 3,4-epoxycyclohexylmethyl acrylate, 3,4-epoxycyclohexylmethyl methacrylate, 6-methyl-3,4-epoxycyclohexylmethyl acrylate, and the like.

By the phrase "terminal alkenyl," as used in the preceding discussion and throughout the specification including the appended claims, is meant an alkenyl radical containing the group $CH_2=C<$ therein. It should be noted that other monoethylenically unsaturated epoxy monomers which contain a polymerizable ethylenic group in lieu of the vinyl group contained in the aforesaid vinyl epoxy monomers also can be employed in the preparation of the copolymers. Illustrative monoethylenically unsaturated epoxy monomers are readily apparent from the preceding discussion.

Preparation of the vinyl epoxy monomers can be found in the literature. U.S. Patent No. 2,785,185, for example, teaches the preparation of epoxy-1-alkene, divinylaryl monoxide, epoxycycloalkylalkyl acylate, terminal alkenyl epoxyalkyl ether, and others. The preparation of alkenyl, cycloalkenyl, and cycloalkenylalkyl 2,3-epoxyalkanoates is taught in application Ser. No. 696,039 entitled "Production of 2,3-Epoxyalkanoates," by B. Phillips and F. C. Frostick, Jr., filed Nov. 13, 1957, and assigned to the same assignee as the instant application. In said application Ser. No. 696,039, there is disclosed the reaction of an alkyl 2,3-epoxyalkanoate with an organic alcohol which contains an ethylenic bond one carbon atom removed from the hydroxyl group, in the presence of a catalytic amount of an alkali metal alcoholate or an alkaline earth metal alcoholate, e.g., sodium methoxide, calcium ethylate, etc., at a temperature in the range of from about 0° to 100° C. for a period of time preferably less than 6 hours. Incorporation by reference of said application Ser. No. 696,039 is hereby made. The alkyl 2,3-epoxyalkanoate can be prepared by reacting the corresponding alkyl 2-alkenoate with peracetic acid at a temperature preferably in the range of from about 25° to 90° C. for a period of time sufficient to introduce oxirane oxygen at the site of the carbon to carbon double bond of the 2-alkenoate ester such as is disclosed in application Ser. No. 696,043 entitled "Epoxidation of Unsaturated Compounds" by B.

Phillips et al., filed Nov. 13, 1957, and assigned to the same assignee as the instant application.

A distinguishing feature of the copolymeric material is that at least one of the monomers from which the copolymers are made has both an oxirane portion and an olefinically unsaturated portion. In addition, the copolymers can contain one or more 1,2-alkylene oxides and/or vinyl epoxy monomers chemically combined therein which can vary over a wide range. Preferably the copolymer can contain from about 5, and lower, to about 95, and higher, of either the 1,2-alkylene oxide or the vinyl epoxy monomer therein, based on the total weight of said 1,2-alkylene oxide(s) and vinyl epoxy monomer(s). The preferred copolymers contain a major proportion by weight of 1,2-alklene oxide and a minor proportion by weight of vinyl epoxy monomer, based on the total weight of 1,2-alkylene oxide and vinyl epoxy monomer. Those copolymers which contain at least 50 weight percent of 1,2-alkylene oxide, e.g., ethylene oxide, propylene oxide, the epoxybutanes, and the like, based on the weight of said polymer, are highly preferred. Those copolymers which contain at least about 50 to about 95 weight percent 1,2-alkylene oxide and from about 50 to about 5 weight percent vinyl epoxy monomer are eminently preferred. It has been observed that copolymers which contain about one weight percent to about 16 weight percent vinyl epoxy monomer are exceptionally preferred since upon cross-linking same there are obtained novel cross-linked polymers which exhibit outstanding and remarkable elastomeric properties.

The copolymers used in preparing the novel cross-linked polymers of this invention can be prepared by contacting the aforementioned monomers, i.e., 1,2-alkylene oxide(s) and vinyl epoxy monomer(s), with a catalytically significant quantity of certain divalent metal carbonates, alkaline earth metal alcoholates, organometallic compounds, or amides described hereinafter.

The divalent metal carbonate catalysts are the carbonates of divalent metals which have an atomic number greater than 11 and which are found below potassium and above tin in the Electromotive Force Series of Elements.[1] These divalent metals include magnesium, calcium, strontium, barium, zinc, cadmium, iron, cobalt, nickel, chromium and manganese. Particularly preferred metal carbonates, from the standpoint of increased catalytic activity, and/or ease of preparation in pure form, are the Group II–A metal carbonates, i.e., the calcium, strontium, or barium carbonates; Group II–B metal carbonates, i.e., the zinc or cadmium carbonates; manganous carbonate; and magnesium carbonate.

In addition to the above-enumerated divalent metal carbonates, it is also observed that the trivalent metal carbonates of the lanthanide series, i.e., rare earth metals, can be employed as catalysts in the instant invention.

It has been observed that the divalent metal carbonates should contain an amount of sorbed water, i.e., adsorbed or absorbed water, which is sufficient to significantly activate or to impart significant catalytic activity to said metal carbonates. The phenomenon regarding sorbed water contained by the metal carbonates is not entirely understood at this time nor is it the desire of the inventor to be bounded by any theories regarding adsorption or absorption phenomena. It is suffice to say that the sorbed water contained by the metal carbonate is firmly tied thereto such that air-drying the metal carbonate for several days at room temperature or slightly above room temperature does not result in any essential weight loss of the sorbed water content in the metal carbonate. The sorbed water bound to the metal carbonates stand in contradistinction to a physical mixture of water and metal carbonate, e.g., an aqueous slurry of metal carbonate, in which latter case the water can be considered to be extraneous water or non-sorbed water. Thus, air-drying a physical mixture of water and metal carbonate results in the removal of the extraneous water or non-sorbed water content from said mixture.

The optimum amount of sorbed water to be contained by the metal carbonates is a natural limit and is governed, to a great extent, by various factors such as the particular metal carbonate contemplated, the method by which the metal carbonate was prepared, the surface area and sorptive characteristics of the metal carbonate, the operative conditions of the polymerization reaction, and other considerations. In general, the greater the surface area of the metal carbonate, the greater the amount of water which can be adsorbed and/or absorbed. As is readily understood, the more hydrophilic metal carbonates, e.g., zinc carbonate, tend to hold greater amounts of sorbed water than those metal carbonates in which the hydrophilic characteristics are slight, e.g., strontium carbonate.

The metal carbonates suitable as catalysts in the process of the instant invention can be prepared by reacting the corresponding divalent metal salt, e.g., the divalent metal chloride, cyanide, and acetate, with sodium carbonate, or other soluble carbonates, and subsequently recovering the resulting divalent metal carbonate precipitate. When the hydroxide of the divalent metal is soluble, the divalent metal carbonate can be obtained as a precipitate by bubbling carbon dioxide into an aqueous solution containing the soluble divalent metal hydroxide. The divalent metal carbonate contemplated as catalysts can also be prepared from salts of the appropriate divalent metal in which the anionic component thereof is one of the catalytically interfering ions. However, the preparation should be carried out so as to minimize the presence of adsorption or occlusion of these interfering ions in the desired carbonate product, e.g., slow precipitation of the carbonate product from relatively dilute aqueous solution, followed by thorough washing or digesting said precipitated carbonate with water or water-containing carbon dioxide.

The divalent metal carbonate is employed in catalytically significant quantities, and, in general, a catalyst concentration in the range of from about 0.01 to about 5.0 weight percent, based on the total weight of monomeric material, is suitable. A catalyst concentration of from about 0.3 to about 3.0 weight percent is preferred. For optimum results, the particular divalent metal carbonate employed, its preparation, its surface area, the nature of the vinyl epoxy monomer and 1,2-alkylene oxide, the operative temperature at which the polymerization reaction is conducted, and other factors will largely determine the desired catalyst concentration.

The second class of catalysts contemplated in the instant process to produce novel polymers are the alkaline earth metal alcoholates. The term "exposure-activated" alkaline earth metal alcoholates will be employed in this specification, including the appended claims to designate those alkaline earth metal alcoholates which have been exposed to (contacted with) water and carbon dioxide according to the teachings herein set forth. The alkaline earth metal alcoholates are compounds containing alkaline earth metal, i.e., strontium, calcium, or barium, in which the metal portion is bonded to mono- or polyhydroxy organic compounds, e.g., alkanols, cycloalkanols, alkylene glycols, or phenols, through the hydroxyl oxygen of at least one of the hydroxy groups of said organic compound. Expressed differently, the alkaline earth metal alcoholates can be characterized by the following formula:

(I)                          RO—M—OR wherein M is an alkaline earth metal, i.e., strontium, calcium or barium; and wherein each R variable can be considered to be derived from the same or different mono- or polyhydroxy organic compounds. It is to be understood, of course, that when R is a polyhydroxy organic

---

[1] Handbook of Chemistry and Physics, 38th Edition, p. 1660; published by Chemical Rubber Co., Cleveland, Ohio.

compound, each M valence also can be separately bonded through two different hydroxyl oxygens of the same R moiety, i.e.

in which case R also may or may not have free hydroxyl groups (—OH) attached thereto.

The organic portion of the alkaline earth metal alcoholates can be derived, for example, from primary, secondary, and tertiary alkanols and cycloalkanols, e.g., methanol, ethanol, n-propanol, isobutanol, n-pentanol, isopentanol, n-hexanol, dodecanol, 2-ethylhexanol, 2,2-dimethyloctanol, benzyl alcohol, 2-phenylethanol, diphenylcarbinol, pentaerythritol, cyclopentanol, cyclohexanol, 4-butylcyclohexanol, 3-octylcyclopentanol, cycloheptanol, and the like; from mono- and polyalkylene glycols, e.g., ethylene glycol, propylene glycol, the butanediols, the pentanediols, 2-methyl-2,3-butanediol, 2-ethyl-1,6-hexanediol, 4,5-octanediol, 1,9-nonanediol, glycerol, β-methylglycerol, diethylene glycol, dipropylene glycol, dibutylene glycol, dipentylene glycol, dihexylene glycol, and the like; from monoalkyl and monoaryl ethers of mono- and polyalkylene glycols, e.g., 2-methoxyethanol, 2-ethoxyethanol, 2-butoxyethanol, 2-benzyloxyethanol, 3-propoxypropanol, 4-hexoxybutanol, 6-benzyloxyhexanol, 2-(β-methoxyethoxy)ethanol, 2 - (β - butoxyethoxy)ethanol, 3-(β-ethoxypropoxy)propanol, 4-(β-hexoxybutoxy)butanol, and the like; from mono- and polyhydroxy-containing aromatic and polyaromatic (including fused aromatic) hydrocarbons, e.g., phenol, resorcinol, catechol, pyrogallol, the cresols, alkyl-substituted phenol, the xylenols, 2,2'-, 2,4'-, 3,3'-, and 4,4'-dihydroxybiphenyl, the naphthols, the naphthalenediols, and the like. The organic portion of the alkaline earth metal alcoholates also can be derived from organic compounds containing both alcoholic hydroxyl and phenolic hydroxyl groups. In addition, the organic portion can contain unreactive groups or groups which do not materially affect the polymerization reaction such as alkoxy, aryloxy, aralkyloxy, alkaryloxy, thio-ether groups, halogen bonded to aromatic carbon, sulfones, aromatic nitro groups, amino groups, and the like.

The catalytic activity of the alkaline earth metal alcoholate can be enhanced upon moderate exposure of said alcoholate to carbon dioxide and water. Such exposure results in a weight increase of the alkaline earth metal alcoholate. However, no simple rule of thumb can be given for determining the optimum weight gain necessary to impart maximum catalytic activity to the alcoholate by exposure to carbon dioxide and water since the particular metal alcoholate of choice, its preparation, its surface area, the operative conditions of the polymerization reaction, etc., are influencing factors to be considered in each case. It has been observed that alkaline earth metal alcoholates in which the organic portion is derived from lower saturated aliphatic alcohols, e.g., methanol and ethanol, require less exposure (or less weight gain), than is the case when the organic portion is derived from, for example, n-hexanol, 2-butoxyethanol, alkylene glycols, and the like, to provide enhanced catalytic activity. Exposure of the preparation of calcium ethylene glycoxide (prepared in a manner similar to that set out in Example 1) to carbon dioxide substantially saturated with water vapor disclosed that the catalytic activity increased with increase in weight of said glycolate up to a weight gain of about 60 percent; thereafter the catalytic activity began to decrease. However, even after a gain in weight of about 70 percent, the glycolate was still more active than the unexposed or untreated compound, i.e., calcium ethylene glycolate. In this particular illustration, the optimum gain in weight was ascertained to be about 45 to 60 percent.

The alkaline earth metal alcoholates can be prepared, for example, by reacting the appropriate alkaline earth metal with the desired hydroxy-containing organic compound. The preparation can be conducted in an inert or substantially inert organic diluent, e.g., dioxane, or liquid ammonia, or in an excess of the hydroxy-containing organic compound itself. It is preferred that the preparation of the alkaline earth metal alcoholates be conducted under an inert atmosphere such as butane, nitrogen, and the like. During the preparation and storage of the alkaline earth metal alcoholates, it is desirable to minimize the presence of carbon dioxide, water, and reactive gases which may come in contact with said alcoholates.

The alkaline earth metal alcoholates in which the organic portion is derived from dihydroxy-containing organic compounds, e.g., ethylene glycol, 1,2-propylene glycol, and the like, can be prepared by reacting the alkaline earth metal per se with the desired dihydroxy-containing organic compound, or, for example, alkaline earth metal methylate with the desired dihydroxy-containing organic compound, preferably in an inert organic diluent. When the latter is employed, it is desirable to heat the reaction medium to a temperature sufficient to remove (in this illustration) the methanol which is given off during the reaction between the alkaline earth metal methylate and the dihydroxy-containing organic compound. A preferred method of preparation is to react the desired dihydroxy-containing organic compound with the alkaline earth metal per se dissolved in liquid ammonia. The resulting product is then recovered by allowing said liquid ammonia to evaporate therefrom; if desired, the recovered product then can be converted to a finely divided state such as by grinding, pulverizing and the like, under an inert atmosphere.

It should be noted that in the preparation of alkaline earth metal alcoholates such as illustrated above, the presence of the reactants in stoichiometric equivalency in the reaction mixture is not narrowly critical. As an illustration, favorable catalytic activity in products prepared by the reaction of 0.95 to 2.0 mols of ethylene glycol per mol of calcium metal was observed.

As stated previously, enhanced catalytic activity is imparted to the alkaline earth metal alcoholates by exposure to carbon dioxide and water. This can be accomplished, for example, by exposing the alcoholate to moist carbon dioxide, preferably carbon dioxide saturated with water vapor, until a weight gain of at least about 0.01 percent, preferably at least about 0.1 percent is observed.

The organometallics contemplated as a third class of catalysts in the preparation of the copolymers of the instant invention can be characterized by the following formula:

(II) $\qquad R_a—M—R_b$ wherein M represents a Group II metal in the Periodic Table, for example, beryllium, magnesium, calcium, strontium, barium, zinc, or cadmium; wherein $R_a$ represents a monovalent hydrocarbon radical; and wherein $R_b$ represents hydrogen, halo, a monovalent hydrocarbon radical, a secondary amino radical, or a hydrocarbyloxy radical, and the like.

The monovalent hydrocarbon radicals can be the aliphatic, aromatic, and alicyclic radicals as exemplified by alkyl, cycloalkyl, aryl, alkaryl, aralkyl, and the like. More specifically, illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the dodecyls, the octadecyls, cyclopentyl, cyclohexyl, cycloheptyl, 2-methylcyclopentyl, 2 - butylcyclohexyl, 3-methylcycloheptyl, phenyl, benzyl, ortho-, meta-, and para-tolyl, the xylyls, butylphenyl, phenethyl, phenylpropyl, phenylbutyl, naphthyl, trimethylphenyl, 9-fluorenyl, and the like. Illustrative secondary amino radicals encompass, for instance, dimethylamino, diethylamino, di-n-propylamino, N-ethylpropylamino, di-2-ethylhexylamino, N-ethyl-m-toluidino, N - propyl - 2,3-xylidino, N-methyl-anilino, N-isopropyl-benzylamino, N-phenyl-benzylamino, N-methyl-N-naphthalamino, and the like. Among the hydrocarbyloxy radicals can be listed, for instance, alkoxy, aryloxy, cycloalkyloxy, and the like, e.g., methoxy, ethoxy, isopropoxy, n-propoxy, n-butoxy, t-butoxy, hexoxy, 2-ethylhexoxy, octoxy, decoxy, dodecoxy, octadecoxy, phenoxy, ortho-, meta-, and para-toloxy, 2-propylphenoxy, butylphenoxy, n-undecylphenoxy, 2-phenethoxy, benzyloxy, cyclopentyloxy, cyclohexyloxy, cycloheptyloxy, alkylcyclohexyloxy, and the like. The halo radicals include chloro, bromo, and iodo.

Illustrative classes of organometallic catalysts which can be employed in the process of the invention include, for example, dialkylzinc, alkylzinc halide, alkylzinc alkoxide dialkylberyllium, alkylberyllium halide, dialkylmagnesium, alkylmagnesium halide, alkylmagnesium alkoxide, dialkylcadmium, alkylcadmium halide, diarylzinc, diarylberyllium, diarylmagnesium, alkylmagnesium dialkylamine, alkylcalcium halide, and the like. Specific examples of the organometallic catalysts include, among others, diethylzinc, di-n-propylzinc, di-n-butylzinc, di-2-ethylhexylzinc, diphenylzinc, n-butylzinc butoxide, octylzinc chloride, phenylzinc bromide, dimethylmagnesium, dipropylmagnesium, propylphenylmagnesium, n - butylmagnesium chloride, diphenylmagnesium, phenylmagnesium chloride, dimethylberyllium diethylberyllium, ethylcalcium iodide, dimethylcadmium, diethylcadmium, dipropylcadmium, diisobutylcadmium, diisoamylcadmium, diethylbarium, diphenylbarium, dibutylbarium, diethylstrontium, butylzinc diethylamide, ethylzinc dipropylamide, and the like.

Another class of organometallics contemplated as a fourth class of catalysts in the preparation of the copolymers of the instant invention can be characterized by the following formula:

(III) $\quad\quad\quad\quad M-(-OR)_y$ wherein M represents a Group II or III metal in the Periodic Table, for example, beryllium, magnesium, calcium, strontium, barium, zinc, cadmium, aluminum, and the like; wherein OR is a hydrocarbyloxy radical such as an alkoxy radical preferably having up to 10 carbon atoms inclusive, more preferably 2 to 4; and wherein $y$ is the valency of the metal M.

The hydrocarbyloxy radical of the catalysts is derived from normal, secondary, or tertiary alcohols. Representative alkoxy radicals include, among others, methoxy, ethoxy, no-propoxy, isopropoxy, n-butoxy, isobutoxy, sec-butoxy, t-butoxy, hexoxy, dodecoxy, octadecoxy, and the like. Illustrative organometallic catalysts include, for example, aluminum triisopropoxide, aluminum tri-t-butoxide, magnesium diisopropoxide, magnesium, di-t-butoxide, and the like.

In practice, it has been desirable to include a promoter in the aforementioned organometallic catalyst systems. For the organometallic catalysts of Formula II, the promoted catalyst system can be a dialkyl metal of Group II of the Periodic Chart, e.g., magnesium, zinc, and the like, and a compound containing an active hydrogen. Suitable active hydrogen compounds include water, methanol, ethanol, propanol, n-butanol, phenol, 2,4-pentadione, and acetic acid. For the organometallic catalysts of Formula II, the catalyst system may be composed of an aluminum trialkoxide, e.g., aluminum tri-isopropoxide, and a zinc halide, such as zinc chloride, zinc bromide, and the like.

A further, and by far one of the more important classes of catalysts which are suitable for use in the instant invention, are the divalent metal amides, the divalent metal amides, the divalent metal amides-alcoholates, and the modified divalent metal amide catalysts.

The preparation of the metal amides is well-known to the art. For instance, the metal hexammoniates can be prepared by reacting the appropriate metal with liquid ammonia, the resulting product being characterized by the Formula $M(NH_3)_6$ wherein M can be calcium, strontium, barium, and the like. The alkaline earth metal amides can be obtained by allowing the corresponding metal hexammoniate to decompose while protecting them from reactive gases and/or vapors such as oxygen, water, and the like. The amides of zinc, cadmium, and barium can also be prepared by the reaction between potassium amide and the bromides of the appropriate metal, the reaction being carried out in liquid ammonia. The reaction of diethylzinc or diethylmagnesium with ammonia gives the corresponding metal amides and ethane as the products. The articles of Bergstrom and Fernelius [2] also disclose various methods for preparing metal amides. The metal amides effective as catalysts in the polymerization reaction are characterized by the Formula $NH_2-M-NH_2$ wherein M is magnesium, calcium, zinc, barium, cadmium, or strontium.

The preparation and use of the divalent metal amide-alcoholates and the doubly modified divalent metal amides are disclosed respectively in U.S. Patents 2,971,988 and 2,969,402 which are hereby incorporated by reference.

The catalysts are employed in catalytically significant quantities. In general, a catalyst concentration in the range of from about 0.001, and lower, to about 10, and higher, weight percent, based, on the weight of total monomeric feed, is suitable. A catalyst concentration in the range of from about 0.01 to about 3.0 weight percent is preferred. A catalyst concentration in the range of from about 0.05 to about 1.0 weight percent is highly preferred. For optimum results, the particular catalyst employed, the nature of the monomeric reagent(s), the operative conditions under which the polymerization reaction is conducted, and other factors will largely determine the desired catalyst concentration.

The polymerization reaction can be conducted at a temperature in the range of from about 0°, and lower, to about 200° C., and preferably from about 70° to about 150° C. As a practical matter, the choice of the particular temperature at which to effect the polymerization reaction depends, to an extent, on the nature of the vinyl epoxy monomer and 1,2-alkylene oxide employed, the particular catalyst employed, the concentration of the catalyst, and the like.

In general, the reaction time will vary depending on the operative temperature, the nature of the vinyl epoxy monomer and 1,2-alkylene oxide employed, the particular catalyst and the concentration employed, the use of an inert organic diluent, and other factors. The reaction time can be as short as a few hours, or shorter, in duration or it can be as long as several days. A feasible and suitable reaction period is from about 5 hours, and lower, to about 100 hours, and longer.

The polymerization reaction takes place in the liquid phase and a pressure above atmospheric may be employed to maintain the liquid phase. However, in the usual case, external pressure is unnecessary, and it is only necessary to employ a reaction vessel capable of withstanding the autogeneous pressure of the reaction mixture. It is highly desirable to conduct the polymerization reaction under substantially anhydrous conditions.

In carrying out the polymerization reaction an induction period may be observed prior to the initiation of the polymerization reaction; this induction period can be as short as, or shorter than, minutes in length or it can be several hours in duration.

The copolymer can be prepared via the bulk polymerization, suspension polymerization, or the solution polymerization routes. The polymerization reaction can be carried out in the presence of an inert organic diluent such as, for example, aromatic solvents, e.g., benzene, chlorobenzene, toluene, xylene, ethylbenzene, and the like; various oxygenated organic compounds such as anisole,

---

[2] Chem. Revs., 12, 43 (1933); Chem. Revs., 20, 413 (1937).

the dimethyl and diethyl ethers of ethylene glycol, of propylene glycol, of diethylene glycol and the like; normally-liquid saturated hydrocarbons, e.g., pentane, hexane, heptane; cycloalkanes, e.g., cyclopentane, cyclohexane, and the like.

The practice, the cross-linking of the aforementioned copolymer, or formulations containing the copolymer, can be effected by a variety of means. By virtue of the highly reactive terminal vinyl or vinylidene sites the copolymer can be cross-linked by the use of, for example, organic peroxide catalysts such as benzoyl peroxide, acetyl peroxide, tertiary butyl hydroperoxide, and the like to form the novel cross-linked polymers. Other suitable curing catalysts include, for example, methyl ethyl ketone peroxide, methyl isobutyl ketone peroxide, cumene hydroperoxide, cyclohexanone peroxide, lauroyl peroxide, di-t-butyl peroxide, t-butyl perbenzoate, and the like. The concentration of the peroxide catalyst can range from about 0.001, and lower to about 10.0 and higher, weight percent and more preferably from about 0.01 to about 5.0, based on the weight of the copolymer.

In a particularly preferred embodiment, the present invention is directed to novel elastomers and elastomeric compositions which are prepared from copolymers of 1,2-alkylene oxides and vinyl epoxy monomers wherein the 1,2-alkylene oxide(s) comprises at least about 84 weight percent; the vinyl epoxy monomer, up to about 16 weight percent. By the term "elastomer" as employed throughout the specification and appended claims is meant a solid, rubbery, copolymer of 1,2-alkylene oxides and vinyl epoxy monomers which has been cross-linked through some, or all, of the pendant olefinic groups, i.e., vinyl or vinylidene groups. These novel elastomeric compositions, especially those prepared from a propylene oxide copolymer gum stock, exhibit a combination of highly desirable and unexpected properties, which, in many instances, are equivalent to, or superior to natural rubber. By introducing only a slight degree of unsaturation into the polymer chain, the elastomer obtained therefrom will be cross-linked at relatively few positions along the polymer chain and thus provide a high degree of flexibility. Hence the undesirable reactivity of natural rubber, which is highly unsaturated, is eliminated and the vulcanized product is more stable to oxygen, ozone, strong acids and the like.

A major shortcoming of many elastomers such as the synthetic rubbers is the tendency of the elastomer to stiffen excessively at low temperature, lack sufficient tensile strength for a desired application, or gradually lose its flexibility over a period of time. Hardening of the elastomer is, of course objectionable, since with a loss of flexibility, the elastomer loses its most distinguishing characteristic and hence ceases to be an elastomer. Loss of the aforementioned properties, particularly flexibility, can ultimately lead to failure by cracking, excessive stiffening, or other undesirable features of the elastomer itself or articles containing the elastomer. Moreover, the inability of many elastomers to flex at low temperatures is important for numerous applications where low temperatures are or may be encountered. This imposes a severe limitation upon the uses to which the synthetic product can be applied.

Fabricators of natural and synthetic elastomers have long sought a relatively inexpensive product that would exhibit excellent tensile strength, good tear strength, and outstanding resistance to low temperature embrittlement. Some progress in this direction has been made with the synthetic elastomers such as the cured butadiene-acrylonitrile copolymers. However, when the acrylonitrile content of the polymer is relatively high in order to obtain grease and solvent resistance, such elastomers were found to have limited flexibility at low temperatures. Moreover, while many synthetic elastomers possess one or more of the desired physical properties, they are usually deficient in others, or economically unattractive for large scale commercial utilization. In contrast, the novel elastomers and elastomeric compositions of this embodiment of the instant invention were found to exhibit excellent tensile properties and a high degree of flexibility over a wide temperature range.

The copolymers employed in this embodiment of the invention are substantially amorphous copolymers which, based on expansivity measurements, exhibit a crystalline content of up to about 35 percent, and higher.[3] Moreover the reduced viscosity is preferably at least 0.5, more preferably at least 1.5, and still more preferably from about 2 to about 30, and higher, as measured at a concentration of 0.2 grams of said copolymer in 100 milliliters of benzene at 30° C. These copolymers can be cured by conventional vulcanization techniques employed in the natural and synthetic rubber arts to form cross-linked elastomeric polymers characterized by the aforementioned physical properties.

Vulcanization of the copolymer gum stock is preferably accomplished with conventional vulcanization agents, e.g., sulfur, peroxides, and the like. For instance, sulfur may be added to the gum stock in its elemental form as finely ground rhombic crystals, as insoluble sulfur for specific uses, such as camelback. Other curatives or vulcanization agents such as those illustrated in the text "Synthetic Rubber" by G. S. Whitby, John Wiley and Sons, Inc., New York (1954), for example Chapter 11 therein. Suitable peroxides include, among others, benzoyl peroxide, acetyl peroxide, dicumyl peroxide, and the like. Oftentimes, when a peroxide is used in conjunction with sulfur, the combined effect of two vulcanization agents imparts even greater properties to the cured product than either one alone.

Accelerators, especially the sulfur-bearing accelerators such as tetramethylthiuram disulfide, selenium diethyldithiocarbamate, dipentamethylene thiuram tetrasulfide, and the like, can also be employed if desired.

In general, the quantity of vulcanization agent employed e.g., sulfur, to effect cross-linking of the copolymer gum stock will be an amount sufficient to impart the desired elastomeric properties to the cured product. The amount employed will, of course, be dependent, in part, upon the degree of unsaturation present in the copolymer gum stock, the molecular weight of the copolymer, the curing conditions, the vulcanization agent of choice, the incorporation of various compounding and/or modifying ingredients into the gum stock such as fillers, extenders, plasticizers, anti-oxidants, etc., and other factors. Consequently, no hard and fast rule can be set forth with regard to the concentration of the vulcanization agent; however, those familiar with the rubber art and especially the vulcanization area of the rubber art can readily determine by mere routine experimentation the desired concentration to be employed for optimum conditions and properties. By way of illustration, it has been observed that very satisfactory vulcanizates can be obtained by employing from about 0.5 part by weight, and lower, to about 30 parts by weight, and higher, of sulfur per 100 parts by weight of copolymer gum stock. Preferably, the sulfur concentration can be from about 1.0 to about 10 parts by weight per 100 parts of the copolymer gum stock. The concentration of the peroxide catalyst can range from about 0.001, and lower, to about 10.0 and higher, parts by weight per 100 parts of copolymer, and more preferably from about 0.01 to about 5.0 per 100 parts of copolymer.

The use of organic accelerators for vulcanization are employed to cure the copolymer gum stock of this invention. Materials suitable for use as accelerators include, benzothiozyl disulfide, N-oxydiethylene benzothiozole-2-sulfenamide, mercaptobenzothiozole, zinc mercaptobenzothiazole, and the like. Ultra accelerators, such as, bismuth dimethyldithiocarbamate, copper dimethyldithiocarbamate, lead dimethyldithiocarbamate, selenium diethyldithiocarbamate, tellurium diethyldithiocarbamate,

---

[3] Work, R. N., Rubber Age, N.Y., 69, 59 (1951).

tetramethylthiuram disulfide, tetraethylthiuram disulfide, and tetramethylthiuram monosulfide, can also be used. Additionally, various accelerator activators are employed, such as, zinc oxide, lead monoxide, magnesium oxide, calcium oxide, precipitated calcium carbonates, urea, amines, furnace blacks, the fatty acids, e.g., stearic acid, metal salts of fatty acids, organic esters of stearic and other fatty acids, and the like.

Various other modifying agents can be added to the copolymer gum stocks to improve their handling characteristics and physical properties. For instance, age resistors which protect the product against deterioration attributed to atmospheric exposure, flex-cracking, and heat deterioration can be incorporated during the compounding step. Suitable age resistors include the Age Rite[4] antioxidants, such as hydroquinone monobenzyl ether, the octylated diphenylamines, phenyl-beta-naphthylamine, diphenyl-p-phenylenediamine, p-isopropoxy diphenylamine and the like. Certain waxy materials such as paraffin, can also be added to the copolymer gum stock which offer protection from sun checking or atmospheric cracking.

Additionally, various curing additives, such as, phenothiazine, 2,2'-methylene bis(4-methyl-6-tert-butyl phenol), and the like, can also be employed, if desired, in small proportions, i.e., in concentrations ranging from about 0.01 to about 6.0 and more preferably from about 0.1 to about 5.0 parts per hundred parts of copolymeric gum stock. It has been observed that vulcanizates which were prepared with a curing additive, in particular phenothiazine, have a retention of strength and elongation under heat-aging conditions equivalent to butyl rubber, a recognized stable elastomer.

The addition of various oils of vegetable or mineral origin, waxes, coal tars, pitches, natural or synthetic resins may also be employed as plasticizers, softeners or tackifiers. These materials are particularly beneficial during the mixing cycle since they permit the incorporation of other added ingredients in the shortest period of time and with a minimum degree of friction.

In most instances it will be desirable to add one or more reinforcing pigments to the copolymer gum stock in order to enhance the strength, hardness and resistance to abrasion or tear. Suitable reinforcing pigments include, among others, various types of carbon blacks, precipitated calcium carbonates, hard clays, hydrated silicon compounds such as calcium silicate and silicon dioxide, and the like. Inert fillers and diluents may also be employed if desired. Illustrative materials include, the soft clays, barytes, blanc fixe, talc, asbestos fiber, cellulose flack, ebonite dust and the like.

Elastomeric products of varying shades of color can be obtained if desired by the addition of various mineral pigments and organic dyes. Although titanium dioxide is probably the most preferred white pigment, white gum stocks can also be prepared by compounding with zinc oxide, zinc sulfide, lithopone, or other mineral pigments.

In general, any one of several methods for mixing and fluxing can be utilized in the preparation of the elastomers and compositions containing the elastomers. For instance, the linear copolymer and any other components of the desired formulation can be intimately dispersed by stirring or tumbling and the admixture fluxed on a steam heated roll mill. As is well recognized in the art, the milling operation should not be effected at a temperature which will cause a breakdown or degradation of the copolymer gum stock. A suitable milling temperature will be below about 100° C., for example, about 70°–80° C. Other methods of mixing and fluxing, such as a banbury cycle followed by calendering can also be employed.

Curing conditions employed for the compounded formulations will not necessarily be the same for each particular copolymer gum stock. The optimum cure will be that state of cure at which the best balance of desired physical properties is achieved and not necessarily a time at which one or more particular chemical reactions have reached a particular point. Thus, in each instance the optimum physical properties most desired for a particular application must be considered and the curing conditions altered accordingly. As a general rule, the curing or the cross-linking operation of the compounded formulations containing the ethylenically unsaturated copolymers can be effected at an elevated temperature, e.g., from about 50° C., and lower, to about 200° C., and higher, generally under superatmospheric pressure, e.g., up to 6,000 p.s.i.g., and higher, and for a period of time sufficient to produce elastomeric products having a combination of desirable characteristics, e.g., from about 5 minutes to about one hour, and longer.

The outstanding and highly desirable physical properties of the elastomer compositions of this embodiment make said compositions particularly useful in various mechanical goods, such as, tires, electrical insulation, cable covering, footwear, gaskets, seals, packing, floor tile, adhesive formulations wherein a flexible bond is desired and the like.

In the following examples, various 1,2-alkylene oxides and vinyl epoxy monomers were copolymerized and subsequently cross-linked to form the novel compositions of this invention. In reporting the physical properties of the cross-linked materials certain tests, symbols and abbreviations were employed. These tests, symbols and abbreviations are defined as follows:

(a) Tensile and elongation.—Standard test specimens were evaluated on a Scott L-6 Tensile Tester operated at a rate of four feet of extensibility per minute.

(b) Stiffness modulus.—In accordance with the procedures given in A.S.T.M. Method D–747–50.

(c) Stiffness temperatures.—$(T_F)°$ C. corresponds to the temperature at which the specimen shows a torsional stiffness of 135,000 p.s.i. as determined from a curve obtained in accordance with A.S.T.M. Method D–1043–51T.

$(T_4)°$ C. corresponds to the temperature at which the specimen shows a torsional stiffness of 10,000 p.s.i. as determined from a curve obtained in accordance with A.S.T.M. Method D–1043–51T.

$(T_B)°$ C. denotes the brittle temperature as determined in accordance with A.S.T.M. Method D–746–55T.

(d) Durometer hardness "A".—In accordance with the procedures given in A.S.T.M. Method D–676–59T.

(e) Tear resistance.—In accordance with the procedure given in A.S.T.M. Method D–470.

(f) Reduced viscosity $(I_R)$.—Reduced viscosity value of copolymer material in 100 milliliters of a given solvent at given temperature. The reduced viscosity values of the copolymers were determined at a concentration of 0.2 gram of the copolymer per 100 milliliters of benzene at 30° C., unless indicated otherwise.

(g) Ozone resistance.—In accordance with the procedure given in A.S.T.M. Method D–1352–59T.

PREPARATION OF POLYMERIZATION CATALYST

Example 1

Calcium metal (20 grams) was dissolved in 1500 milliliters of liquid ammonia. To the resulting solution there was slowly added a solution of 29.4 grams of ethylene glycol in 400 milliliters of liquid ammonia under continuous stirring. Subsequently, the ammonia was allowed to weather off for a period of 16 to 18 hours until a dry, grayish-white product remained. The resulting product, calcium glycoxide, was pulverized to a finely divided powdery state under a nitrogen atmosphere, and subsequently, this powdery product was divided into several portions. Each portion except the control was individually placed into a desiccator (maintained at approximately 25° C.) for varying periods of time. These "exposure activated"

---
[4] Trademark for R. T. Vanderbilt Co., Inc., antioxidants.

calcium glycoxides were catalytically active. Other pertinent data are disclosed in Table I below.

TABLE I

| Sample Number | Catalyst [1] | Exposure Time, Hours | Weight Percent Gain [2] |
|---|---|---|---|
| 1 | Calcium glycoxide | 0.00 | |
| 2 | do | 0.08 | 6.3 |
| 3 | do | 0.17 | 13.6 |
| 4 | do | 0.5 | 22.6 |
| 5 | do | 1.0 | 26.0 |
| 6 | do | 3.0 | 57.8 |
| 7 | do | 4.0 | 75.0 |
| 8 | do | 3.0 | 64.8 |

[1] Exposed to moist carbon dioxide as indicated.
[2] Based on the weight of calcium glycoxide prior to exposure to moist carbon dioxide.

Example 2

Strontium carbonate was precipitated by bubbling carbon dioxide into an aqueous solution of strontium hydroxide octahydrate. The precipitated strontium carbonate was recovered by filtration and subsequently, various samples thereof were heated at different temperatures. One sample was heated at 55° C. until the strontium carbonate contained about 1.5 weight percent sorbed water; a second sample was heated at 120° C. until the strontium carbonate contained about 1.0 weight percent sorbed water; and a third sample was heated at 200° C. until the strontium carbonate contained about 0.5 weight percent sorbed water. All three of these samples were observed to be active polymerization catalysts.

On continued heating the said three strontium carbonate samples above 250° C., the catalytic activity thereof was progressively reduced. On heating the samples at a temperature of 350° to 400° C. for 24 to 48 hours, i.e., to a point wherein the sorbed water was essentially nil, the strontium carbonate samples became essentially inactive as catalysts.

PREPARATION OF ALKYLENE OXIDE-VINYL EPOXIDE COPOLYMERS

In Examples 3 to 34 below, the procedure employed to prepare the copolymers was as follows: A 9-inch Pyrex tube 22 millimeters in diameter was sealed at one end, the other end of the tube was fitted with a 3-inch piece of 8 millimeter Pyrex tubing. In some instances when larger quantities of the copolymer were desired a 9-inch Pyrex tube having a 2-inch diameter and sealed as above was employed. The tube was cleaned, dried and flushed with dry nitrogen. Thereafter a weighed quantity of the indicated catalyst was introduced into the tube. The monomeric mixture was then charged to the tube in a "dry box" containing a nitrogen atmosphere. The tube was then closed with a rubber cap, cooled in Dry Ice-acetone bath, and sealed under the vacuum thus obtained. Thereafter the sealed tube was inserted into an aluminum block which was gently agitated by rocking at the desired operating temperature for a given period of time. At the end of the indicated period the tube was broken open and the reaction product placed in a vacuum, e.g., about 2 to about 15 millimeters of mercury at from about 30° to about 45° C., until dried. In most instances 1 percent by weight, based on the weight of the charged compositions, of an antioxidant, such as, 2,2'-methylene bis(4-methyl-6-tertiary butyl phenol), was added to the copolymer. In other examples, the polymerization reaction was conducted in a two-liter, stainless steel, stirred autoclave.

Example 3

Butadiene monoxide [5] (3 grams), ethylene oxide (27 grams), and strontium carbonate (0.9 gram, containing approximately 0.5 weight percent sorbed water) were sealed in a small glass tube and agitated in a water bath at 92° C. for 64 hours. A yield of 100 percent solid polymer was obtained. The reduced viscosity values of the polymer in water, acetonitrile, and benzene, respectively, at a concentration of 0.2 gram of polymer per 100 milliliters of solvent at 30° C. were as follows: water, 3.3; acetonitrile, 2.2; benzene, 3.3.

When 2-methyl-2,3-epoxypropyl acrylate and propylene oxide is substituted for the above-mentioned monomeric feed, a resinous copolymer is obtained which discloses ethylenic unsaturation upon infra-red analysis.

Examples 4–9

The procedure of Example 3 was repeated in the following six experiments. The total weight of the monomeric charge was 30 grams; 0.9 gram of strontium carbonate (approximately 0.5 weight percent sorbed water) was employed in all the runs. The pertinent data and results are shown in Table II below.

TABLE II

| Example | Butadiene Monoxide [1] | Ethylene Oxide [1] | Yield (percent) | Reduced Viscosity in— | | |
|---|---|---|---|---|---|---|
| | | | | Water | Acetonitrile | Benzene |
| 4 | 10 | 90 | 98 | | 2.5 | 3.0 |
| 5 | 10 | 90 | 94 | 2.7 | 2.1 | |
| 6 | 20 | 80 | 91 | 2.9 | 2.5 | 3.4 |
| 7 | 20 | 80 | 100 | 3.1 | 2.3 | 3.4 |
| 8 | 20 | 80 | 72 | 2.8 | 2.1 | 3.0 |
| 9 | 30 | 70 | 80 | 2.9 | 2.4 | 2.5 |

[1] Weight percent of component in question, based on the total weight of monomeric feed.

Example 10

Butadiene monoxide (3 grams), ethylene oxide (27 grams), and strontium carbonate (0.9 gram, containing approximately 0.5 weight percent sorbed water) were sealed in a small glass tube and agitated in a water bath 95° C. for 88 hours. A yield of 100 percent solid polymer was obtained. The reduced viscosity values of the polymer in water, acetonitrile, and benzene, respectively, at a concentration of 0.2 gram of polymer per 100 milliliters of solvent at 30° C. were as follows: water, 2.3; acetonitrile, 1.7; benzene, 3.0.

In a manner similar to the above procedure, 2,3-butylene oxide and allyl 9,10-epoxystearate can be polymerized to give a solid polymer which discloses, under infra-red examination, ethylenic unsaturation.

Example 11

Butadiene monoxide (3 gram), 1,2-epoxybutane (9 grams), ethylene oxide (18 grams) and strontium carbonate (0.9 gram, containing about 0.5 weight percent sorbed water) were sealed in a small glass tube and agitated for 88 hours at 95° C. in a water bath. A resinous polymer was obtained which possesed a reduced viscosity value in benzene of 3.1, and in acetonitrile of 1.2. On heating to about 100° C. for 5 minutes the resin water-insolubilized and displayed a rubber-like elasticity.

Example 12

Chloroprene oxide (3 grams), ethylene oxide (27 grams), and strontium carbonate (3.0 weight percent, based on total weight of monomeric feed, containing approximately 0.5 weight percent sorbed water) were sealed in a small test tube and agitated in a water bath at 90° C. for 66 hours. The yield was 18.5 grams of resinous polymer which had a reduced viscosity value of 1.64 in acetronitrile.

[5] Purity, 97.4 percent; boiling point, 67° C./atm.; $n_D^{30}$, 1.4124. Butadiene oxide employed in Examples 4–11 was from the same batch.

In an analogous manner as above, when equal parts by weight of propylene oxide and allyl 3,4-epoxycyclohexenecarboxylate are polymerized in the presence of 3.0 weight percent of the above-named catalyst, a resinous copolymer is obtained which, upon infra-red analysis, discloses ethylenic unsaturation.

Example 13

To a two-liter, stainless steel stirred autoclave, there were charged 256 grams ethylene oxide, 18 grams butane (vapor phase stabilizer for the ethylene oxide) 14.5 grams butadiene monoxide, 572 grams toluene and 0.87 gram "exposure activated" calcium gylcoxide prepared in the manner set forth in Example 1 supra. The reaction mixture was stirred at 102–107° C. for 20 hours. At the end of this time, the polymer product was precipitated from toluene solution with hexane, recovered, and dried under vacuum at 30° C. a 69 percent yield (186 grams) of polymer was obtained. The polymer had a reduced viscosity of 1.25 acetonitrile. This resin was found to contain 2.3 percent butadiene monoxide by iodine titration.

In a manner similar to the above procedure when 100 grams of 1,2-epoxypentane and 150 grams of allyl 3,4-epoxycyclohexylmethyl ether are polymerized in the presence of 1.0 weight percent of the above-designated catalyst (based on the total weight of monomeric charge), a resinous copolymer is obtained which disclosed, under infra-red analysis, ethylenic unsaturation.

Example 14

Twenty grams of toluene, 9.5 grams of ethylene oxide, and 0.5 gram of allyl-2,3-epoxybutyl ether together with 0.13 gram of exposure activated calcium glycoxide catalyst were sealed in a Pyrex glass polymerization tube. The catalyst was prepared in the manner set forth in Example 1 supra. The tube was gently agitated at 90° C. for 45 hours. At the end of this period of time, the tube was broken and the polymer product was precipitated from the toluene solution by the addition of hexane thereto. The polymer was recovered by filtration, and dried under vacuum at 30° C. Substantially complete conversion to polymer was obtained. The copolymer was found to have a reduced viscosity of 4.2 in 0.2 weight percent solution in both benzene and acetonitrile at 30° C. By iodine titration, the copolymer was found to contain 3.8 percent of the allyl 2,3-epoxybutyl ether combined in the resin.

When an equivalent molar amount of epoxycyclohexane is substituted for the ethylene oxide, a resinous copolymer is obtained which, under infra-red analysis, discloses ethylenic unsaturation.

Example 15

To a two-liter, stainless steel stirred autoclave, there were charged 203 grams of ethylene oxide, 14 grams of butane, 72 grams of allyl glycidyl ether, and 572 grams of toluene together with 1.44 grams of "exposure activated" calcium glycoxide catalyst prepared in the manner set forth in Example 1 supra. The autoclave was stirred at a temperature of about 90° C. for a period of 44 hours. At the end of this period, there was added to the toluene solution 5 grams of N,N,N',N'-tetrakis(2-hydroxypropyl) ethylenediamine. The polymer was precipitated from the toluene solution by the addition of hexane thereto, then recovered by decantation, and dried under vacuum at about 35° C. A yield of 62 grams of resinous polymer was obtained which had a reduced viscosity value of 1.2 in acetonitrile. By iodine titration, the resin was shown to be a copolymer containing 11 percent allyl glycidyl ether combined in the resin. A portion of this resin was molded into a plaque which was found to have stiffness of 10,000 p.s.i. (by A.S.T.M. Test D–747–50).

In an analogous manner as above, when 100 grams of 1,2-epoxyhexane and 200 grams of 1,2-epoxy-3-methyl-4-pentene are polymerized in the presence of 1.5 weight percent of the above-designated catalyst, a resinous copolymer is obtained which, upon infra-red analysis, discloses ethylenic unsaturation.

Examples 16–34

In a manner similar to that employed in Example 3 various vinyl epoxy monomers were copolymerized with either propylene oxide or butylene oxide in the presence of 1.0 weight percent, based on the weight of comonomers, of di-n-butylzinc catalyst which had been modified with one half mole equivalent of methanol. The proportions of alkylene oxide and vinyl epoxy monomer employed as well as other pertinent data are set forth in Table III below.

Additionally, various vinyl epoxy monomers were also copolymerized with ethylene oxide, propylene oxide or butylene oxide in the presence of 1.0 weight percent of the doubly-modified calcium amide catalyst. The polymerizations were conducted in both isooctane and toluene and the resulting polymers were stabilized prior to isolation by the addition of 1 percent of 2,2-methylenebis(4-methyl-6-tertiarybutylphenol) based on the comonomers charged. The proportion of alkylene oxide and vinyl epoxy monomer employed as well as other pertinent data are set forth in Table III–A below.

TABLE III.—COPOLYMERIZATION OF ALKYLENE OXIDES AND VINYL EPOXY MONOMERS

| Example | Charged Composition in Weight Percent | Grams Charged | Grams Yield | Polymerization time at 90–100° C. in hours | Percent Comonomer [1] | Reduced Viscosity |
|---|---|---|---|---|---|---|
| 16 | Propylene oxide, 70; 7,8-epoxyoctene-1, 30 | 200 | 143 | 66 | 22.7 | 1.39 |
| 17 | do | 150 | 89.5 | 24 | 19.9 | 2.15 |
| 18 | Propylene oxide, 80; 7,8-epoxyoctene-1, 20 | 200 | 168 | 66 | 25.2 | 1.60 |
| 19 | do | 150 | 125.5 | 24 | 16.0 | 2.55 |
| 20 | Propylene oxide, 90; 7,8-epoxyoctene-1, 10 | 150 | 131 | 78 | 10.2 | 1.74 |
| 21 | Propylene oxide, 98; 7,8-epoxyoctene-1, 2 | 150 | 65 | 96 | 3.7 | 30.01 |
| 22 | Propylene oxide, 70; butadiene monoxide, 30 | 150 | 106 | 57 | 27.7 | 1.52 |
| 23 | Propylene oxide, 85; butadiene monoxide, 15 | 150 | 150 | 24 | [2] | |
| 24 | Propylene oxide, 90; butadiene monoxide, 10 | 125 | 112 | 78 | 10.7 | 1.75 |
| 25 | Propylene oxide, 95; butaidene monoxide, 5 | 90 | 82 | 16 | 4.87 | 19.63 |
| 26 | Propylene oxide, 98; butadiene monoxide ,2 | 150 | 103 | 24 | 2.8 | 24.79 |
| 27 | Propylene oxide, 70; allyl glycidyl ether, 30 | 150 | 140 | 96 | [2] | |
| 28 | Propylene oxide, 85; allyl glycidyl ether, 15 | 150 | 142 | 24 | [2] | |
| 29 | Propylene oxide, 95; allyl glycidyl ether, 5 | 90 | 83 | 16 | 5.65 | 20.94 |
| 30 | Propylene oxide, 98; allyl glycidyl ether, 2 | 150 | 92 | 96 | 3.17 | 17.30 |
| 31 | Propylene oxide, 95; 1,2.epoxypentene-4, 5 | 90 | 84 | 16 | 5.04 | 15.25 |
| 32 | Butylene oxide, 95; 7,8-epoxyoctene-1, 5 | 90 | 64 | 16 | 7.15 | 6.54 |
| 33 | do | 150 | 130 | 96 | 7.3 | 4.28 |
| 34 | Propylene oxide, 100 | 150 | 140 | 48 | 0.85 | 2.27 |

[1] Percent vinyl epoxy monomer in copolymer by analysis for unsaturation (Wiji Method).
[2] Cross-linked during polymerization reaction.

TABLE III-A.—COPOLYMERIZATION OF ALKYLENE OXIDES AND VINYL EPOXY MONOMERS

| Example | Charged Composition in Weight Percent | Yield in Percent | Reduced Viscosity | Percent Comonomer [1] |
|---|---|---|---|---|
| A | Ethylene oxide, 70; 7,8-epoxyoctene-1, 30 | 12 | 1.7 | 8.4 |
| B | Ethylene oxide, 85; allyl glycidyl ether, 15 | 38 | 4.2 | 14.2 |
| C | Ethylene oxide, 98; butadiene monoxide, 2 | 63 | 3.9 | 2.1 |
| D | Propylene oxide, 98; 7,8-epoxyoctene-1, 2 | 91 | 4.2 | 5.5 |
| E | Propylene oxide, 95; 7,8-epoxyoctene-1, 5 | 93 | 4.8 | 7.2 |
| F | Propylene oxide, 85; 7,8-epoxyoctene-1, 15 | 90 | 3.4 | 14.8 |
| G | Propylene oxide, 70; 7,8-epoxyoctene-1, 30 | 81 | 1.9 | 23 |
| H | Propylene oxide, 85; allyl glycidyl ether, 15 | 87 | 3.9 | 16.1 |
| I | Butylene oxide, 98; allyl glycidyl ether, 2 | 78 | 7.0 | 4.7 |
| J | Butylene oxide, 85; allyl glycidyl ether, 15 | 55 | 4.3 | 9.1 |
| K | Butylene oxide, 95; 7,8-epoxyoctene-1, 5 | 61 | 2.9 | 6.4 |

[1] Calculated as weight percent comonomer.

PREPARATION OF CROSS-LINKED POLYMERS

The alkylene oxide-vinyl epoxide copolymers obtained in Examples 16 to 34 were cross-linked through the pendant vinyl groups in accordance with the following general procedure: The copolymer was fluxed on a two-roll, 3-inch by 8-inch, Thropp, steam-heated, equal speed mill. Milling temperatures ranged from room temperature (i.e., about 25° C.) to about 140° C. The break down time of milling was about 5 minutes. For each 100 parts by weight of the copolymer there were added, by weight, and in the following sequence: 5 parts of zinc oxide, 1 part of stearic acid, 50 parts of Kosmobile Beads (a channel black carbon), 2 parts of sulfur, 1.0 part of Captax (mercaptobenzothiozol), and one part of Methyl Tuads (tetramethylthiuram disulfide). The total time on the mill, including break down time ranged from 15 minutes to approximately 30 minutes. Thereafter the material compounded by this formation was cured in a 6-inch by 6-inch by 0.075-inch flash mold under pressures of from about 1500 to about 4000 pounds per square inch pressure for 30 minutes at 150° C. After curing, the cross-linked polymer was cooled and evaluated for its physical properties. The data obtained is set forth in Table IV below:

TABLE IV.—PHYSICAL PROPERTIES OF CROSS-LINKED ALKYLENE OXIDE-VINYL EPOXIDE COPOLYMERS

| Ex. | Hardness (Shore A) | Stress Maximum [1] | Elongation Maximum [2] | Stiffness Modulus at 10% [1] | Stress [1] at — | | | Tension Set | | Tear Strength [3] | Stiffness Temperature | |
|---|---|---|---|---|---|---|---|---|---|---|---|---|
| | | | | | 100% | 200% | 300% | 10 sec. | 10 min. | | $T_F$, °C. | $T_4$, °C. |
| 16 | 60 | 960.0 | 300.0 | 500.0 | 330.0 | 610.0 | 905.0 | 42.0 | 40.0 | 60.0 | −65.0 | −53.0 |
| 17 | 44 | 580.0 | 684.0 | 300.0 | 102.0 | 158.0 | 225.0 | 92.0 | 86.0 | 27.0 | −66.5 | −56.0 |
| 18 | 56 | 1,100.0 | 430.0 | 500.0 | 290.0 | 550.0 | 787.0 | 68.0 | 64.0 | 66.0 | −66.5 | −53.0 |
| 19 | 60 | 2,030.0 | 590.0 | 550.0 | 310.0 | 600.0 | 920.0 | 80.0 | 80.0 | 93.5 | −64.8 | −54.0 |
| 20 | 68 | 2,030.0 | 564.0 | 900.0 | 380.0 | 710.0 | 1,085.0 | 82.0 | 80.0 | 82.0 | −64.0 | −52.0 |
| 21 | 65 | 2,980.0 | 760.0 | 850.0 | 250.0 | 385.0 | 600.0 | 36.0 | 34.0 | 84.0 | −64.0 | −49.5 |
| 22 | 48 | 910.0 | 510.0 | 400.0 | 170.0 | 320.0 | 495.0 | 66.0 | 64.0 | 51.8 | −61.0 | −51.5 |
| 23 | 71 | 900.0 | 135.0 | 1,020.0 | 660.0 | | | 4.0 | 4.0 | 24.0 | −62.0 | −52.5 |
| 24 | 53 | 1,110.0 | 650.0 | 450.0 | 190.0 | 340.0 | 510.0 | 90.0 | 84.0 | | −62.5 | −53.0 |
| 25 | 70 | 2,540.0 | 670.0 | 900.9 | 330.0 | 580.0 | 950.0 | 72.0 | 72.0 | 116.5 | −63.5 | −47.5 |
| 26 | 63 | 2,000.0 | 812.0 | 600.0 | 200.0 | 300.0 | 430.0 | 62.0 | 54.0 | 91.8 | −64.5 | −54.5 |
| 27 | 76 | 1,670.0 | 262.0 | 1,000.0 | 665.0 | 1,310.0 | | 20.0 | 20.0 | 49.1 | −64.5 | −50.5 |
| 28 | 77 | 1,225.0 | 130.0 | 1,400.0 | 1,000.0 | | | 4.0 | 2.0 | 20.0 | −63.5 | −55.5 |
| 29 | 67 | 3,180.0 | 600.0 | 800.0 | 430.0 | 830.0 | 1,360.0 | 40.0 | 38.0 | 80.0 | −64.5 | −57.8 |
| 30 | 60 | 3,360.0 | 790.0 | 600.0 | 240.0 | 380.0 | 595.0 | 44.0 | 40.0 | 71.5 | −65.0 | −57.5 |
| 31 | 69 | 2,900.0 | 515.0 | 900.0 | 485.0 | 1,020.0 | 1,600.0 | 54.0 | 52.0 | 72.0 | −63.5 | −55.5 |
| 32 | 63 | 1,780.0 | 485.0 | 500.0 | 250.0 | 540.0 | 905.0 | 40.0 | 38.0 | 62.5 | −65.5 | −53.5 |
| 33 | 62 | 2,260.0 | 605.0 | 500.0 | 280.0 | 605.0 | 975.0 | 62.0 | 60.0 | 61.0 | −65.0 | −55.2 |
| 34 | 50 | [4] 84.0 | 145.0 | 500.0 | 78.0 | | | 72.0 | 70.0 | 8.2 | −65.5 | −48.5 |

[1] Measured in pounds per square inch at indicated percent elongation. [2] Measured in percent. [3] Measured in pounds per inch thickness
[4] Yield stress 95.0.

Example 35

The resinous polymers from Examples 4, 7, 10, and 11 were insolubilized by milling, molding or other treatment as indicated in Table V below. Various physical properties of the polymers after the indicated treatment are also tabulated therein. The results and pertinent data are set forth in Table V below.

TABLE V

| Example | 12 | 15 | 18 | 19 |
|---|---|---|---|---|
| Milled, min./° C | 15/30–40 [1] | | 5/30–50 | |
| Molded, min./° C | 30/140–145 | 30/140 | 30/140 | |
| Water Solubility after— | | | | |
| 1. Milling | Insoluble [2] | Insoluble [2] | Insoluble [2] | Insoluble.[2] |
| 2. Molding | do.[2] | Insoluble [2] | do.[2] | Do.[2] |
| Tensile, p.s.i | 1,400 | 950 | | |
| Elongation, percent | 650 | 550 | | |
| Load at 100% Elong., p.s.i | 1,175 | 700 | | |
| ASTM Stiffner Modulus | 11,150 | 10,000 | | |
| Flex. Temperature: | | | | |
| ($T_F$), ° C | −50 | −57 | | |
| ($T_4$), ° C | 15 | 7 | | |
| Brittle Temperature: ($T_B$), ° C | −44 | −46 | | |
| Durometer Hardness "A" | 93 | 88 | | |

[1] The ethylene oxide copolymer was fluxed on a two-roll mill heated to 35–40° C. For each 100 parts by weight of the resin there were added, by weight, in the following order one part of "Agerite" powder (phenyl-beta-naphthylamine), two parts sulfur, three parts stearic acid, one part "Captax" (mercaptobenzothiozol), 0.9 part "Accelerator 808" (butyraldehydeaniline condensation product marketed by E. I. du Pont de Nemours Company, Inc.) and five parts zinc oxide. The compounded material thus obtained was then cured in a 5.5-inch mold at 140–145° C. for 30 minutes to obtain test specimens used in determining the physical properties listed.
[2] Very slight swelling.

Examples 36–37

In order to demonstrate the resistance of the novel cross-linked polymers to oxidation, samples of a crosslinked propylene oxide-7,8-epoxyoctene-1 copolymer were subjected to an oven-oxidation test at 125° C. For comparative purposes neoprene was subjected to the same test. After exposure for one week (168 hours), retention of elongation and hardness were good for the cross-linked polymer, whereas the neoprene sample hardened and retained only 10 percent elongation. The data obtained is set forth in Table VI below.

TABLE VI.—OXIDATION RESISTANCE OF CROSS LINKED PROPYLENE OXIDE-7,8-EPOXYOCTENE-1 COPOLYMER

| Example | Hours Exposure at 125° C. | Hardness Shore A | Elongation in Percent |
|---|---|---|---|
| 36 | 0 | 55 | 730 |
|  | 168 |  | 555 |
|  | 336 | 48 | 380 |
| 37 | 0 | 50 | 850 |
|  | 168 | 52 | 548 |
|  | 336 | 51 | 464 |
| Neoprene [1] | 0 | 71 | 370 |
|  | 168 | 97 | 10 |
|  | 336 | 99 |  |

[1] Cut parallel to the direction of orientation.

Example 38

In order to demonstrate the resistance of the novel cross-linked polymers to ozone, a sample of a cross-linked propylene oxide-7,8-epoxyoctene-1 copolymer was subjected to conditions ten times more severe than the conditions set forth in the ASTM Test Method D-1352-59T for ozone resisting butyl rubber insulation. For comparative purposes neoprene was subjected to the same test. At an initial zone concentration of 0.30 percent by volume, the neoprene rubber disintegrated in eight minutes. At the end of three hours the output of the ozone generator had decreased to 0.08 percent by volume. The cross-linked propylene oxide-7,8-epoxyoctene-1 copolymer showed no sign of degradation.

Examples 39–42

In order to compare the properties of the novel cross-linked polymers of this invention with natural rubber, two samples of a propylene oxide-7,8-epoxyoctene-1 copolymer and two samples of natural rubber were compounded with a standard rubber formulation for vulcanizing the sulfur. The formulations were blended by fluxing on a two-roll mill at 75° C. for 20 minutes and then molded into test specimens at pressures of from 1500 to 2500 pounds per square inch. The curing temperatures were 150° C. for the polyether copolymer and 140° C. for the natural rubber. The results of the test are set forth in Table VII below:

TABLE VII.—COMPARISON OF CROSS-LINKED POLYMERS WITH NATURAL RUBBER

| Physical Properties | Formulation [1] | | | |
|---|---|---|---|---|
|  | I | II | III | IV |
| Hardness (Shore A) | 74 | 66 | 68 | 67 |
| Tensile: |  |  |  |  |
| Strength, p.s.i | 2,980 | 2,860 | 4,050 | 4,000 |
| Elongation, percent | 830 | 800 | 508 | 515 |
| Stress at— |  |  |  |  |
| 10% p.s.i | 60 | 85 | 70 | 70 |
| 100% p.s.i | 220 | 245 | 470 | 470 |
| 200% p.s.i | 375 | 400 | 1,080 | 1,095 |
| 300% p.s.i | 600 | 670 | 1,900 | 1,900 |
| Tensile Set, percent (after 10 minutes) | 50 | 48 | 40 | 40 |
| Tear Strength, lbs./inch | 94.0 | 92.0 | 68 | 71 |
| Stiffness-temp.: |  |  |  |  |
| $T_F$, ° C | −65 | −65 | −59 | −59 |
| $T_4$, ° C | −45 | −46 | −48 | −49 |

[1] Formulations I and II prepared from propylene oxide-7,8-epoxyoctene-1 copolymer containing 95.4 weight percent propylene oxide. Formulations III and IV prepared from natural rubber.

Example 43

A sealed-glass tube containing 45.0 grams ethylene oxide, 5.0 grams butadiene monoxide, 0.29 gram aluminum triisopropoxide and 0.12 gram zinc chloride is rotated in an air-circulating oven at 80° C. for 64 hours. The tube is then opened and the solid contents dissolved in dry benzene. The benzene solution is filtered to remove the insoluble portion of the catalyst and the filtrate evaporated at reduced pressure to yield a solid, white residue. This residue is further dried at 35° C. and 10 mm. pressure for 24 hours. The polymeric product is obtained in 86% yield, has a reduced viscosity in chloroform at 25° C. of 1.6, a reduced viscosity in benzene at 25° C. of 1.0, and contains 5.7% butadiene monoxide by weight.

Example 44

A glass reaction vessel equipped with mechanical stirrer, thermometer, condenser cooled with Dry Ice and gas-inlet tube is thoroughly dried by heating to 150° C. and cooling under dry nitrogen. To the cooled vessel which is continually swept with dry nitrogen is added 128 grams dry toluene, 5.18 grams butadiene monoxide, 0.55 gram water and 40.8 milliliters of a 1 molar (1 gram mole of solute per liter of solution) solution of di-n-butylzinc in dry toluene. Ethylene oxide A63.3 grams), which has previously been dried for two hours is added to the stirred mixture by slow distillation through the gas-inlet tube. A maximum temperature of 40° C. is recorded during the addition period. All of the ethylene oxide is added in three hours and stirring under a blanket of nitrogen is continued for an additional 12 hours. The gelled reaction mixture is chopped in a mechanical blender with excess n-heptane to remove solvent and unreacted monomers. After the chopping of the undissolved solid with fresh n-heptane has been repeated three times, the solid is dried at 35° C. and 10 mm. for 24 hours. The polymer is thus obtained in 75 percent yield, has a reduced viscosity in chloroform at 25° C. of 6.95 and contains 1.6 percent butadiene monoxide by weight. A film of this white, powdery copolymer is prepared by heating a sample to 70° C and by pressing at 800 pounds per square inch pressure. A 0.006 inch thick film, so prepared, is found to be water soluble, but if this film is heated to 200° C. for 15 minutes, it becomes water insoluble.

Examples 45–50

In order to demonstrate the effect of a curing additive on the physical properties of the cross-linked polymers, samples of a propylene oxide-allyl glycidyl ether copolymer having a reduced viscosity value of at least 1.0 were sulfur cured in the presence of phenothiazine and the resulting crosslinked polymers subjected to heat stability studies.

Compounding was effected in accordance with the following general procedure:

The copolymer was fluxed on a two-roll, 3-inch by 8-inch, Thropp, steam-heated, equal speed mill. Milling temperatures ranged from room temperature (i.e., about 25° C.) to about 140° C. The break down time of milling was about 5 minutes. For each 100 parts by weight of the copolymer there were added, by weight, and in the following sequence: 5 parts of zinc oxide, 1 part of stearic acid, 50 parts of Kosmobile Beads (a channel black carbon), 1 part of phenothiazine, 2 parts of sulfur, 1 part of Captax (mercaptobenzothiozol), and one part of Methyl Tuads (tetramethylthiuram disulfide). The total time on the mill, including break down time ranged from 15 minutes to approximately 30 minutes. Thereafter the material compounded by this formation was cured in a 6-inch by 6-inch by 0.04-inch flash mold under pressures of from 2000 to about 4000 pounds per square inch pressure for 30 minutes at 150° C. After curing, the cross-linked polymer was cooled and evaluated for its physical properties. For comparison purposes, Examples 45 and 46 omitted the Kosmobile Beads. Additionally, Examples 45, 47 and 49 were cross-linked in the absence TABLE VIII.—HEAT STABILITY STUDY OF CROSS-LINKED ALKYLENE VINYL EPOXIDE COPOLYMERS [1]

| Example | Curing Additive [6] | Ultimate Tensile Strength [2] | | | Ultimate Tensile Elongation [3] | | |
|---|---|---|---|---|---|---|---|
| | | Original | Final | Percent Retained | Original | Final | Percent Retained |
| 45 [5] | 0 | 2,700 | (4) | | 950 | (4) | |
| 46 [5] | 1 | 2,440 | 1,520 | 62 | 880 | 710 | 80 |
| 47 | 0 | 3,500 | 1,900 | 54 | 800 | 430 | 54 |
| 48 | 1 | 3,250 | 2,600 | 80 | 820 | 550 | 67 |
| 49 | 0 | 3,170 | 560 | 18 | 820 | 160 | 20 |
| 50 | 1 | 3,200 | 1,650 | 52 | 850 | 400 | 47 |

[1] 97 weight percent propylene oxide and 3 weight percent allyl glycidyl ether in copolymerized form.
[2] In pounds per square inch.
[3] In percent.
[4] Melted, could not support its own weight in the oven after 144 hours.
[5] Carbon black omitted. Polymerization of copolymer effected with dibutyl zinc catalyst.
[6] Parts per hundred parts elastomer.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A solid elastomeric vulcanizate obtained by sulfur curing the pendant terminal alkenyl groups which are contained in a copolymer having a reduced viscosity value of at least 0.5 as measured at a concentration of 0.2 gram of said copolymer in 100 milliliters of benzene at 30° C., said copolymer resulting from the polymerization of an admixture containing a major proportion by weight of 1,2-alkylene oxide and a minor proportion by weight of a vinyl epoxy monomer through the vicinal epoxy groups thereof, said vinyl epoxy monomer having the formula:

$$CH_2=\overset{X}{\underset{|}{C}}-(R)_n-A$$

wherein $n$ is an integer which has a value of from 0 to 1, wherein X is selected from the group consisting of hydrogen, halogen, and alkyl, wherein R is a divalent saturated aliphatic hydrocarbon radical, and wherein A is selected from the group consisting of vicinal-epoxyalkyl, vicinal-epoxyalkoxy, vicinal-epoxycycloalkoxy, vicinal-epoxycycloalkylalkoxy, vicinal-epoxyalkylaryl, and vicinal-epoxyalkylsulfonyl.

2. The solid elastomeric vulcanizate of claim 1 wherein said 1,2-alkylene oxide is a lower 1,2-alkylene oxide.

3. The solid elastomeric vulcanizate of claim 1 wherein said 1,2-alkylene oxide is ethylene oxide.

4. The solid elastomeric vulcanizate of claim 1 wherein said lower 1,2-alkylene oxide is an admixture of ethylene oxide and propylene oxide.

5. A solid elastomeric vulcanizate obtained by sulfur curing the pendant terminal alkenyl groups which are contained in a copolymer having a reduced viscosity of at least 0.5 as measured at a concentration of 0.2 gram of said copolymer in 100 milliliters of benzene at 30° C., said copolymer resulting from the polymerization of an admixture containing a major proportion by weight of lower 1,2-alkylene oxide and a minor proportion by weight of vicinal-epoxyalkyl substituted alkene-1 through the vicinal epoxy group thereof.

6. A solid elastomeric vulcanizate obtained by sulfur curing the pendant terminal alkenyl groups which are contained in a copolymer having a reduced viscosity of at least 0.5 as measured at a concentration of 0.2 gram of said copolymer in 100 milliliters of benzene at 30° C., said copolymer resulting from the polymerization of an admixture containing a major proportion by weight of lower 1,2-alkylene oxide and a minor proportion by weight of alk-1-enyl vicinal-epoxyalkyl ether through the vicinal epoxy groups thereof.

7. A solid elastomeric vulcanizate obtained by sulfur curing the pendant terminal alkenyl groups which are contained in a copolymer having a reduced viscosity of at least 0.5 as measured at a concentration of 0.2 gram of said copolymer in 100 milliliters of benzene at 30° C., said copolymer resulting from the polymerization, through the vicinal epoxy groups, of an admixture containing at least about 84 weight percent propylene oxide and up to about 16 weight percent of a vinyl epoxy monomer having the formula:

$$CH_2=\overset{X}{\underset{|}{C}}-(R)_n-A$$

wherein $n$ has a value of from 0 to 1, where X is selected from the group consisting of hydrogen, halogen, and alkyl, wherein R is a divalent saturated aliphatic hydrocarbon radical, and wherein A is selected from the group consisting of vicinal-epoxyalkyl, vicinal-epoxyalkoxy, vicinal-epoxycycloalkoxy, vicinal-epoxycycloalkylalkoxy, vicinal-epoxyalkylaryl, and vicinal-epoxyalkylsulfonyl, said elastomeric vulcanizate having incorporated therein a small proportion of phenothiazine.

8. The solid elastomeric vulcanizate of claim 5 wherein said lower 1,2-alkylene oxide is an admixture of ethylene and propylene oxide.

9. The solid elastomeric vulcanizate of claim 6 wherein said lower 1,2-alkylene oxide is an admixture of ethylene oxide and propylene oxide.

10. A solid elastomeric vulcanizate obtained by sulfur curing the pendant terminal alkenyl groups which are contained in a copolymer having a reduced viscosity of at least 0.5 as measured at a concentration of 0.2 gram of said copolymer in 100 mililiters of benzene at 30° C., said copolymer resulting from the polymerization of an admixture containing a major proportion by weight of ethylene oxide plus propylene oxide and a minor proportion by weight of allyl glycidyl ether, said polymerization being effected through the vicinal epoxy group of the aforedescribed epoxides.

11. A solid elastomeric vulcanizate obtained by sulfur curing the pendant terminal alkenyl groups which are contained in a copolymer having a reduced viscosity of at least 0.5 as measured at a concentration of 0.2 gram of said copolymer in 100 milliliters of benzene at 30° C., said copolymer resulting from the polymerization of an admixture containing a major proportion by weight of ethylene oxide plus propylene oxide and a minor proportion by weight of chloroprene oxide, said polymerization being effected through the vicinal epoxy group of the aforedescribed epoxides.

12. A solid elastomeric vulcanizate obtained by sulfur curing the pendant terminal alkenyl groups which are contained in a copolymer having a reduced viscosity of at least 0.5 as measured at a concentration of 0.2 gram of said copolymer in 100 milliliters of benzene at 30° C., said copolymer resulting from the polymerization of an admixture containing a major proportion by weight of ethylene oxide plus propylene oxide and a minor proportion by weight of butadiene monoxide, said polymerization being effected through the vicinal epoxy group of the aforedescribed epoxides.

13. A solid elastomeric vulcanizate obtained by sulfur curing the pendant terminal alkenyl groups which are contained in a copolymer having a reduced viscosity of at least 0.5 as measured at a concentration of 0.2 gram of said copolymer in 100 milliliters of benzene at 30° C., said copolymer resulting from the polymerization of an admixture containing a major proportion by weight of ethylene oxide plus epoxybutane and a minor proportion by weight of allyl glycidyl ether, said polymerization being effected through the vicinal epoxy group of the aforedescribed epoxides.

References Cited

UNITED STATES PATENTS

| | | |
|---|---|---|
| 2,439,828 | 4/1948 | Swedish. |
| 2,476,922 | 7/1949 | Shokal et al. |
| 2,808,391 | 10/1957 | Pattison _____ 260—79.5 X |
| 3,031,439 | 4/1962 | Bailey. |
| 3,065,213 | 11/1962 | Vandenberg _____ 260—88.3 |

FOREIGN PATENTS 834,158  5/1960  Great Britain.

OTHER REFERENCES

Furukawa et al.: "Polymerization of Propylene Oxide By Diethylzinc In The Presence of Cocatalysts," Die Makronolekulare Chemie.

Sakata et al.: "Polymerization of Propylene Oxide and Vinyl Compounds By Diethylzinc In The Presence of Cocatalysts," Die Makromalekulare Chemie.

JOSEPH L. SCHOFER, *Primary Examiner.*

D. DENENBERG, *Assistant Examiner.*

U.S. Cl. X.R.

260—88.3, 2, 79.3, 775, 784, 793, 785, 783, 795, 791, 45.9, 45.95, 28.5, 28, 37, 4, 17